United States Patent
O'Donnell

(10) Patent No.: US 7,946,718 B2
(45) Date of Patent: May 24, 2011

(54) SYSTEM AND METHOD FOR OPTICAL CALIBRATION OF A PICTURE MODULATOR

(75) Inventor: Eugene Murphy O'Donnell, Fishers, IN (US)

(73) Assignee: TTE Technology, Inc., Indianapolis, IN (US)

( * ) Notice: Subject to any disclaimer, the term of this patent is extended or adjusted under 35 U.S.C. 154(b) by 1126 days.

(21) Appl. No.: 11/660,438

(22) PCT Filed: Sep. 21, 2005

(86) PCT No.: PCT/US2005/033937
§ 371 (c)(1),
(2), (4) Date: Feb. 16, 2007

(87) PCT Pub. No.: WO2006/036727
PCT Pub. Date: Apr. 6, 2006

(65) Prior Publication Data
US 2007/0279537 A1    Dec. 6, 2007

Related U.S. Application Data

(60) Provisional application No. 60/613,068, filed on Sep. 24, 2004.

(51) Int. Cl.
G03B 3/00      (2006.01)
G03B 21/00     (2006.01)
G03B 21/14     (2006.01)

(52) U.S. Cl. ............................ 353/101; 353/69; 353/122

(58) Field of Classification Search .............. 353/30–31, 353/34, 46, 48, 51, 69, 85, 94, 100–101, 353/122; 348/739, 744–745, 771, 806
See application file for complete search history.

(56) References Cited

U.S. PATENT DOCUMENTS

| | | | |
|---|---|---|---|
| 5,597,223 A * | 1/1997 | Watanabe et al. | 353/97 |
| 6,222,593 B1 | 4/2001 | Higurashi et al. | |
| 6,243,055 B1 | 6/2001 | Fergason | |
| 6,407,726 B1 | 6/2002 | Endo et al. | |
| 6,520,647 B2 * | 2/2003 | Raskar | 353/70 |
| 7,306,341 B2 * | 12/2007 | Chang | 353/94 |
| 7,434,937 B2 * | 10/2008 | Chung | 353/70 |
| 2003/0090635 A1 * | 5/2003 | Cheng et al. | 353/70 |
| 2003/0210381 A1 * | 11/2003 | Itaki | 353/70 |
| 2005/0018144 A1 * | 1/2005 | Wada et al. | 353/69 |
| 2005/0041216 A1 * | 2/2005 | Kobayashi | 353/69 |
| 2005/0041217 A1 * | 2/2005 | Tajima | 353/69 |
| 2005/0046804 A1 * | 3/2005 | Akutsu | 353/70 |
| 2008/0192017 A1 * | 8/2008 | Hildebrandt et al. | 345/173 |

FOREIGN PATENT DOCUMENTS

| | | |
|---|---|---|
| CN | 1467479 | 1/2004 |
| JP | 2004258125 | 9/2004 |

* cited by examiner

Primary Examiner — Tony Ko
Assistant Examiner — Jori S Reilly-Diakun
(74) Attorney, Agent, or Firm — Fletcher Yoder PC

(57) ABSTRACT

The disclosed embodiments relate to a system and method for optical calibration of a picture modulator. More specifically, there is provided a video unit (10) comprising a modulator (18) configured to modulate a projection lens assembly (16) between a first position and a second position, a photodiode assembly (22) configured to produce a first voltage corresponding to a first pixel pattern generated when the projection lens assembly (16) is in the first position and to produce a second voltage corresponding to a second pixel pattern when the projection lens assembly (16) is the second position, and a video control system (26) configured to adjust the location of the second position based on the first and second voltages.

20 Claims, 3 Drawing Sheets

SYSTEM AND METHOD FOR OPTICAL CALIBRATION OF A PICTURE MODULATOR

CROSS-REFERENCE TO RELATED APPLICATIONS

This application is a continuation of International Patent Application Serial No. PCT/US2005/033937, filed on Sep. 21, 2005, which claims priority to U.S. Provisional Patent Application No. 60/613,068, filed on Sep. 24, 2004.

FIELD OF THE INVENTION

The present invention relates generally to projecting video images onto a screen. More specifically, the present invention relates to a system for optically calibrating a pixel-shift modulator in a video display unit.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Projection-based video units create video images by varying the color and shade of projected light. One example of a projection-based video unit is a digital light processing ("DLP") system, which employs an optical semiconductor, known as a digital micromirror device ("DMD") to create video images. Another example of a projection-based video unit is a liquid crystal display ("LCD") projection system, which projects light through one or more LCD panels to create video images. Many first generation DLP and LCD systems employed a 1:1 correspondence between the resolution of the imaging system and the display resolution. However, it can be expensive to produce DMDs and LCD panels that maintain this 1:1 correspondence while providing higher resolution programming, such high definition television ("HDTV"). For this reason, several techniques have been developed to facilitate the display of video images at resolutions above those natively available from a DMD or LCD panel.

Pixel-shifting is one such resolution-enhancing technique. In pixel-shifting, the light generated by a video imaging system within a video unit, such as a DMD or and LCD, is shifted to focus on more than one pixel locations on a screen. For example, in a DLP system, the light reflected off of one of the micromirrors may be directed at a first pixel location, then at a second pixel location, then back to the first pixel location, and so forth to increase the resolution of the DLP system beyond what is available natively from the DMD. Typically, pixel-shifting is performed by a mechanically modulated projection lens or mirror that can shift between two or more different positions. For example, in a DLP-based system, the projection lens assembly may first direct light from one of the micromirrors on the DMD to the display screen at a first pixel location. After the first pixel has been displayed for a given period of time, the projection lens assembly may be actuated to shine light from the same DMD micromirror at a second pixel location. The projection lens assembly alternates rapidly between the two positions to display each respective pixel. The result is a first and second pixel displayed in separate positions on the display screen.

As will be appreciated, one of the challenges in designing pixel-shifting systems is calibrating the mechanical modulator such that the shifted pixels are displayed in the proper location. Conventional calibration systems either employed an open-loop system wherein the user adjusted the pixel-shifting using a test pattern or employed a closed-loop system that measured the physical movement of the modulator. Disadvantageously, these conventional systems are either unreliable or relatively expensive.

Embodiments of the present invention may relate to an improved system and method for calibrating a pixel shift modulator in a video unit.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for optical calibration of a picture modulator. More specifically, there is provided a video unit comprising a modulator configured to modulate a projection lens between a first position and a second position, a photodiode assembly configured to produce a first voltage corresponding to a first pixel pattern generated when the projection lens is in the first position and to produce a second voltage corresponding to a second pixel pattern when the projection lens is the second position, and a video control system configured to adjust the location of the second position based on the first and second voltages.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
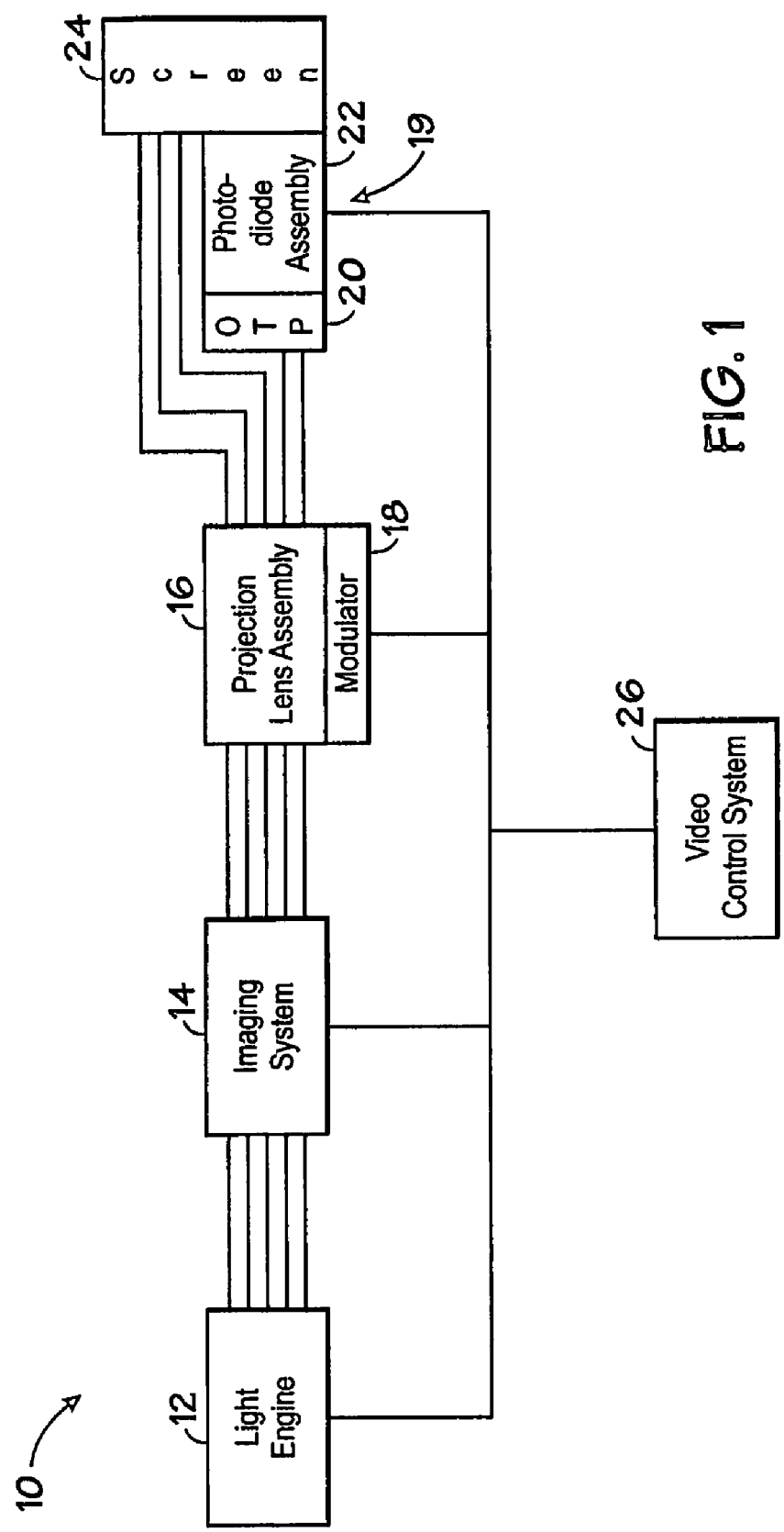
FIG. 1 is a block diagram of a video unit configured to calibrate a pixel shift modulator in accordance with embodiments of the present invention.

Turning initially to FIG. 1, a block diagram of a video unit configured to calibrate a pixel-shift modulator in accordance with one embodiment is illustrated and generally designated by a reference numeral 10. In one embodiment, the video unit 10 may comprise a Digital Light Processing ("DLP") projection television or projector. In another embodiment, the video unit 10 may comprise a liquid crystal display ("LCD") projection television or projector. In still other embodiments, the video unit 10 may comprise another suitable form of projection television or display.

The video unit 10 may include a light engine 12. The light engine 12 is configured to generate white or colored light that can be employed by an imaging system 14 to create a video image. The light engine 12 may include any suitable form of lamp or bulb capable of projecting white or generally white light. In one embodiment, the light engine 12 may be a high intensity light source, such as a metal halide lamp or a mercury vapor lamp. For example, the light engine 12 may include an ultra high performance ("UHP") lamp produced by Philips Electronics. The light engine 12 may also include a component configured to convert the projected white light into colored light, such as color wheels, dichroic mirrors, polarizers, and filters. Moreover, in alternate embodiments, the light engine 12 may include components capable of generating color light, such as light emitting diodes.

As described above, the light engine 12 may be configured to project, shine, or focus colored light at the imaging system 14. The imaging system 14 may be configured to employ the colored light to create images suitable for display on a screen 24. As described further below, the imaging system 14 may be configured to generate one or more pixel patterns that can be used to calibrate pixel shifting in the video unit 10. In one embodiment, the imaging system 14 comprises a DLP imaging system that employs one or more DMDs to generate a video image using the colored light. In another embodiment, the imaging system may employ an LCD projection system. It will be appreciated, however, that the above-described exemplary embodiments are not intended to be exclusive, and that alternate embodiments, any suitable form of imaging system 14 may be employed in the video unit 10.

As illustrated in FIG. 1, the imaging system 14 may be configured to project images into a projection lens assembly 16. The projection lens assembly 16 may include one or more lenses and/or mirrors that project the image created by the imaging system 14 onto the screen 24. In one embodiment, the projection lens assembly 16 includes a folded mirror. The projection lens assembly may also be coupled to a modulator 18 capable of shifting the projection lens assembly 16 about an axis to facilitate pixel-shifting within the video unit 10. In one embodiment, the modulator 18 may be configured to shift the projection lens assembly 16 between two positions. In alternate embodiments, the modulator 18 may be configured to shift the projection lens assembly between three, four, or more different positions.

As illustrated, light exiting the projection lens assembly 16 may be directed to either the screen 24 or to a modulator calibration assembly 19. In one embodiment, the modulator calibration assembly 19 may be located in an overscan region of the video unit 10. The modulator calibration assembly 19 may include an optical target plate 20 and a photodiode assembly 22. The optical target plate 20 is configured to filter or block light projected by the projection lens assembly to facilitate calibration of the modulator 18, as will be described below. In one embodiment, the optical target plate includes a grating comprising a series of transparent and opaque stripes (see FIGS. 2 and 3) which are etched on the optical target plate 20 at half the pixel pitch of the imaging system 14 at a 45 degree angel to the pixel pattern and oriented orthogonal to the major axis of the modulator 18. It will be appreciated, however, that the exact pattern on the optical target plate 20 may be different in alternate embodiments. Moreover, in some embodiments, the optical target plate may be omitted from the video unit 10 and the modulator 18 may be calibrated using the photodiode assembly 22 without the optical target plate 20.

As illustrated in FIG. 1, the optical target plate 20 may be oriented between the projection lens assembly 16 and the photodiode assembly 22. The photodiode assembly 22 may be comprised of a series of photo-transistors or other light sensitive sensors that may be configured to convert light projected from the projection lens assembly 16 into voltages. As described further below, the video unit 10 may use voltages generated by the photodiode assembly 22 to calibrate the modulator 18.

The light engine 12, the imaging system 14, the modulator 18, and the photodiode assembly 22 may each be communicatively coupled to a video control system 26, which is configured to control the calibration of the modulator 18. The video control system 26 may also include one or more processors, associated memory, and/or other suitable control system components. The video control system 26 may also include an on-screen display ("OSD") pattern generator that is configured to generate one or more video images or pixel patterns that can facilitate calibration of the modulator 18, as described below. Further, the video control system 26 may also include an analog-to-digital ("A/D") converter or other component suitable for converting voltages generated by the photodiode assembly 22 into digital signals, which the video control system 26 can use to calibrate the modulator 18. In one embodiment, the video control system 26 may be configured to execute software or instructions to calibrate the modulator 18.

Figure 2:
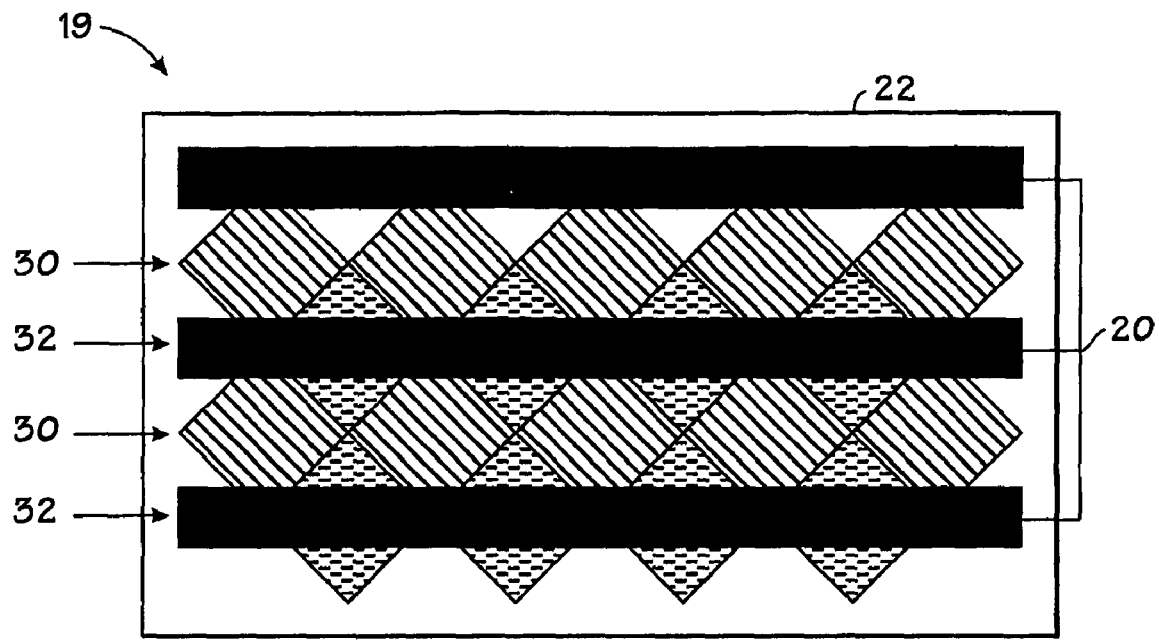
FIG. 2 illustrates a modulator calibration assembly in combination with a non-offset pixel pattern in accordance with embodiments of the present invention.

As will be described further below, the video unit 10 may be configured to calibrate the modulator 18 by comparing voltages generated by the photodiode assembly 22 when the modulator 18 is in a non-offset position with voltages generated when the modulator 18 is in an offset position. Accordingly, FIG. 2 illustrates the modulator calibration assembly 19 in combination with a non-offset pixel pattern from the perspective of the projection lens assembly 18 in accordance with one embodiment. For simplicity, like reference numeral have been used to designate those features previously described in relation to FIG. 1. FIG. 2 illustrates the optical target plate 20 (only the opaque stripes are visible) in front of the photodiode assembly 22. Projected onto the photodiode assembly 22 are four rows of pixels (the illustrated diamond shaped boxes) labeled as rows 30 and rows 32. The pixels in the rows 30 (shaded with diagonal lines) are mostly visible through the opaque stripes of the optical target plate 20 when the modulator is in a non-offset position; whereas the pixels in the rows 32 (shaded with dashed horizontal lines) are mostly obscured by the opaque stripes when the modulator is in the non-offset position.

Figure 3:
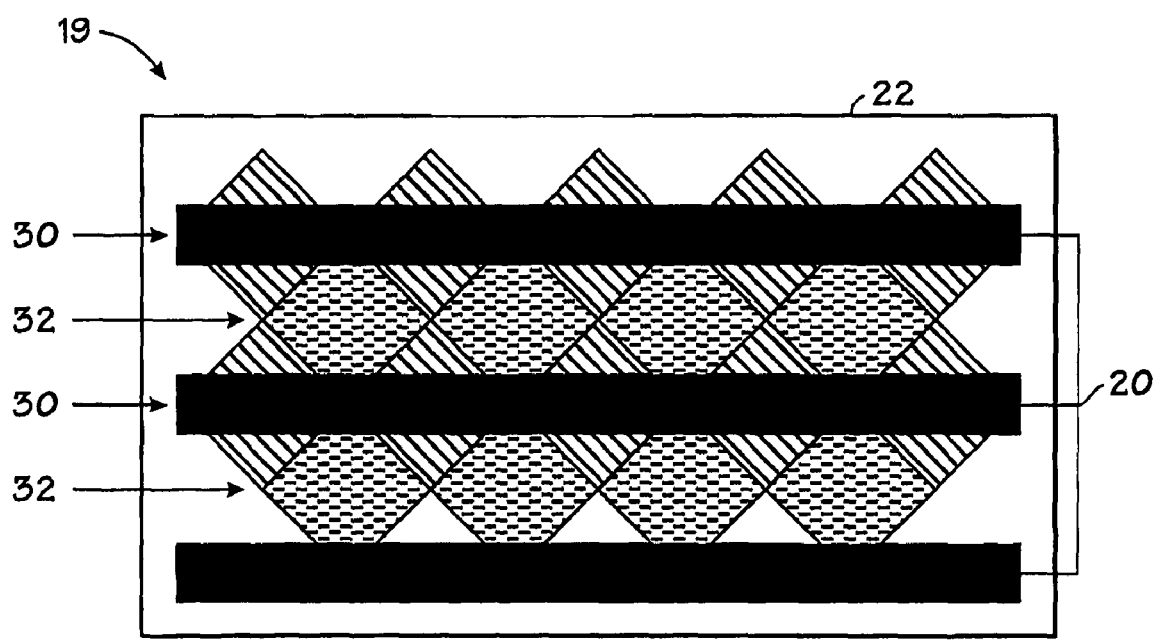
FIG. 3 illustrates a modulator calibration assembly in combination with an offset pixel pattern in accordance with embodiments of the present invention.

On the other hand, FIG. 3 illustrates the modulator calibration assembly 19 in combination with an offset pixel pattern from the perspective of the projection lens assembly 18 in accordance with one embodiment. As with FIG. 2, like reference numeral have been used to designate those features previously described in relation to previous figures. FIG. 3 illustrates the movement of the rows 30 and 32 with an offset of one-half a pixel by the modulator 18. As illustrated, when the modulator 18 is offset by one-half a pixel, the pixel rows 30 become mostly obscured and the pixel rows 32 become mostly visible through the optical target plate 20. As described further below, the video unit 10 may employ this difference in visibility through the optical target plate in the offset and non-offset positions of the modulator 18 to calibrate the modulator 18.

Figure 4:
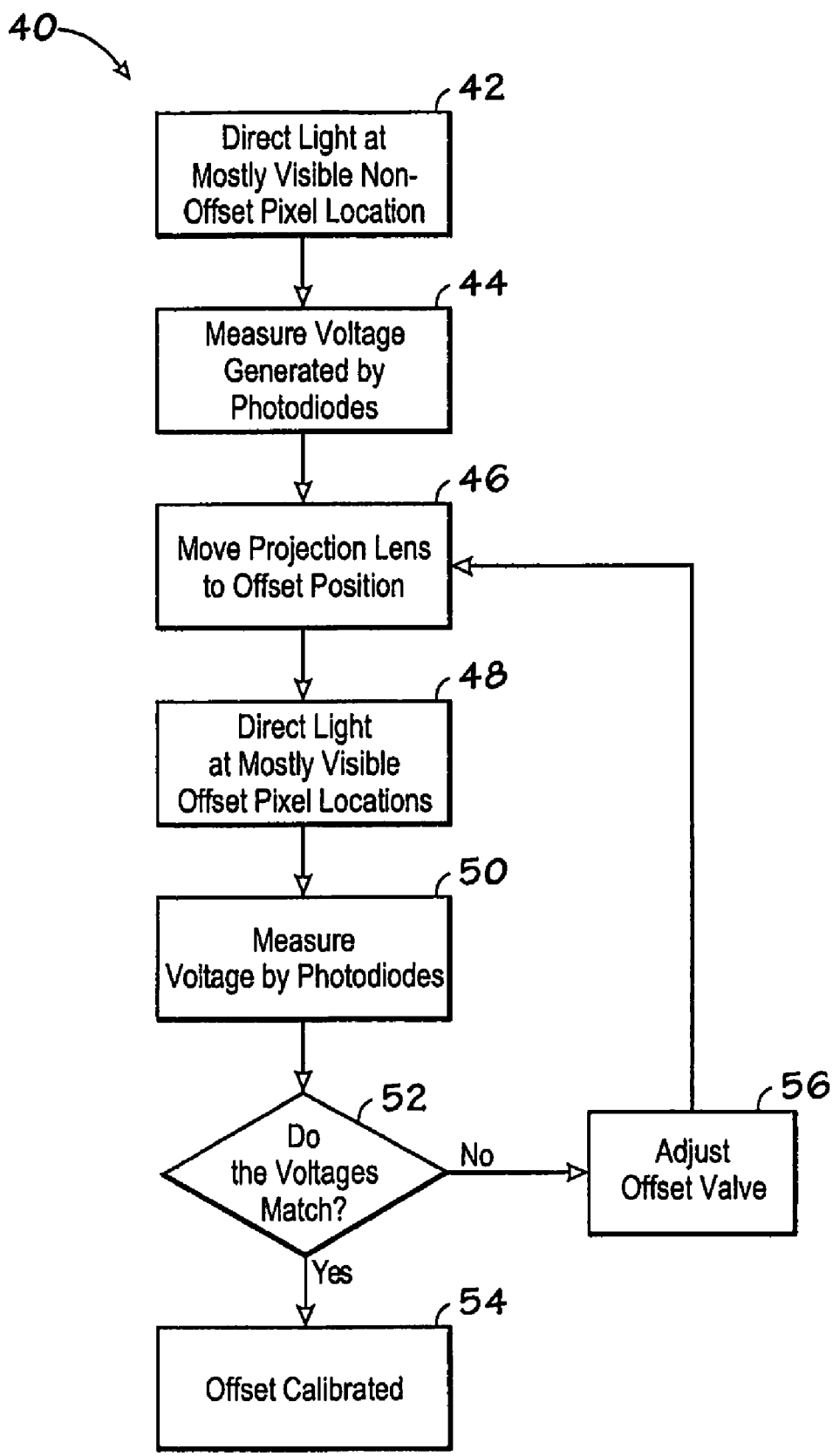
FIG. 4 is a flow chart illustrating an exemplary technique for optical calibration of a modulator in accordance with embodiments of the present invention.

FIG. 4 is a flow chart illustrating an exemplary technique for optical calibration of the modulator 18 in accordance with one embodiment. In one embodiment, the video control system 26 may perform the technique 40 in conjunction with the light engine 12, the imaging system 14, the modulator 18, and the photodiode assembly 22 to calibrate the modulator to offset pixels by one-half of a pixel width. As indicated by block 42, the technique 40 may begin with the imaging system 14 directing light at the pixel locations that are mostly visible through the optical target plate 20 when the modulator is in the non-offset position. In one embodiment, directing light at the mostly visible non-offset pixel locations includes generating a pixel pattern where the pixels in the row 30 are illuminated (e.g., white or another color) and the row 32 is not illuminated (i.e., black). Once the pixels in the row 30 have been illuminated, the video control system 26 may measure the voltage generated by the photodiode assembly 22 while the pixels in the row 30 are illuminated.

Next, the video control system 26 may direct the modulator 18 to move the projection lens assembly 16 to the offset position, as indicated by block 46. Once the modulator 18 has moved, the video control system 26 may direct the imaging system 14 to illuminate the pixel locations that should be mostly visible when the modulator 18 is in the offset position. In one embodiment, directing light at the pixel locations that should be mostly visible when the modulator is at the offset position includes illuminating the pixels in the row 32 and not illuminating the pixel locations in the row 30. After illuminating the pixels in the row 32, the video control system 26 may measure the voltage generated by the photodiode assembly 22, as indicated in block 50. If the voltage measured in block 44 and the voltage measured in block 50 match within a predetermined degree of error, the video control system 26 may determine that the offset of the modulator 18 is properly calibrated to shift pixels by one-half of a pixel, as indicated in block 54.

If, however, the voltage measured in block 44 and the voltage measured in block 50 do not match within a predetermined degree of error, it may indicate that the modulator 18 is not properly calibrated. As such, the video control system 26 may adjust the offset value of the modulator 18, as indicated by block 56. In one embodiment, adjusting the offset value of the modulator 18 may include either increasing or decreasing the movement of the projection lens assembly 16. After the offset value of the modulator 18 has been adjusted, the technique 40 may cycle back to block 46 to determine whether the adjusted offset value is the correct calibration. The technique 40 continues in this manner until the voltage generated by the photodiodes when the modulator is in the offset position matches the voltage generated by the photodiodes when the modulator is in the non-offset position within a predetermined margin of error. It will be appreciated, however, that it may take multiple adjustments for the modulator 18 to be calibrated.

While the technique 40 was described above it terms of calibrating the modulator 18 with one offset position of one-half pixel, in alternate embodiments, the video unit 10 may also be configured to calibrate multiple offset positions. For example, once the video control system 26 has determined the correct modulator position for a one-half pixel shift, the video control system 26 may use this position to determine intermediate positions for the modulator 18. Alternatively, the video control system 26 can be programmed with target photodiode voltages that correspond to various positions of the modulator 18 and calibrate the movement of the modulator 18 to generate the target voltages in the photodiode assembly. Moreover, while the technique 40 is described using the optical target plate 20, in alternate embodiments, the video control system can be configured to calibrate the modulator 18 based on the pixel patterns alone.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A video unit comprising:
 a modulator configured to modulate a projection lens assembly between a first position and a second position;
 a photodiode assembly configured to produce a first voltage corresponding to a first pixel pattern generated when the projection lens assembly is in the first position and to produce a second voltage corresponding to a second pixel pattern generated when the projection lens assembly is in the second position; and
 a video control system configured to adjust the location of the second position based on a comparison between the first and second voltages.

2. The video unit of claim 1, wherein the video control system is configured to adjust the location of the second position until the second voltage approximately matches the first voltage.

3. The video unit of claim 1, comprising an imaging system configured to generate the first pixel pattern and the second pixel pattern.

4. The video unit of claim 1, comprising an optical target plate, wherein the optical target plate includes two or more opaque stripes that are configured to partially obscure either the first pixel pattern or the second pixel pattern.

5. The video unit of claim 1, wherein the modulator is configured to modulate the projection lens assembly between the first position, the second position, and a third position.

6. The video unit of claim 1, wherein the video control system comprises an analog to digital converter to convert the first voltage and the second voltage into digital signals.

7. The video unit of claim 1, wherein the video unit comprises a digital light processing system or a liquid crystal display system.

8. A method comprising:
 (a) directing light through a projection lens assembly at a first location on a photodiode assembly;
 (b) measuring a first voltage generated by the photodiode assembly based on the light directed at the first location on the photodiode assembly;
 (c) modulating the projection lens assembly to a first offset position;
 (d) directing light through the projection lens assembly at a second location on the photodiode assembly;
 (e) measuring a second voltage generated by the photodiode assembly based on the light directed at the second location on the photodiode assembly; and
 (f) adjusting the location of the first offset position based on a comparison between the first voltage and the second voltage.

9. The method of claim 8, comprising:
(g) modulating the projection lens assembly to the adjusted first offset position.

10. The method of claim 9, comprising repeating steps (d)-(g) until the first voltage approximately matches the second voltage.

11. The method of claim 8, wherein the steps are performed in the recited order.

12. The method of claim 8, wherein directing light through the projection lens assembly at the first location comprises directing light at pixels in a first pixel pattern through an optical target plate arrayed between the projection lens assembly and the photodiode assembly.

13. The method of claim 12, wherein directing light at pixels through the optical target plate comprises directing light through an optical target plate including a plurality of opaque stripes.

14. The method of claim 8, comprising:
(g) modulating the projection lens assembly to a second offset position, wherein the second offset position is between an initial position of the projection lens assembly and the first offset position.

15. A video unit, comprising:
means for directing light through a projection lens assembly at a first location on a photodiode assembly;
means for measuring a first voltage generated by the photodiode assembly based on the light directed at the first location on the photodiode assembly;
means for modulating the projection lens assembly to a first offset position;
means for directing light through the projection lens assembly at a second location on the photodiode assembly;
means for measuring a second voltage generated by the photodiode assembly based on the light directed at the second location on the photodiode assembly; and
means for adjusting the location of the first offset position based on a comparison between the first voltage and the second voltage.

16. The video unit of claim 15, comprising:
means for modulating the projection lens assembly to the adjusted first offset position.

17. The video unit of claim 15, wherein the means for directing light through the projection lens assembly at the first location is configured to direct light at pixels in a first pixel pattern through an optical target plate arrayed between the projection lens assembly and the photodiode assembly.

18. The video unit of claim 15, wherein the means for directing light at pixels through the optical target plate is configured to direct light through an optical target plate including a plurality of opaque stripes.

19. The video unit of claim 1, comprising an optical target plate, wherein the optical target plate includes opaque pattern features that are configured to partially obscure either the first pixel pattern or the second pixel pattern.

20. The method of claim 8, wherein directing light through the projection lens assembly at the first location comprises directing light at pixels in a first pixel pattern through an optical target plate including opaque pattern features and arrayed between the projection lens assembly and the photodiode assembly.

* * * * *